United States Patent
Cheng et al.

(10) Patent No.: US 11,403,250 B2
(45) Date of Patent: Aug. 2, 2022

(54) OPERATION ACCELERATOR, SWITCH, TASK SCHEDULING METHOD, AND PROCESSING SYSTEM

(71) Applicant: HUAWEI TECHNOLOGIES CO., LTD., Guangdong (CN)

(72) Inventors: Chuanning Cheng, Shenzhen (CN); Shengyong Peng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/216,250

(22) Filed: Mar. 29, 2021

(65) Prior Publication Data
US 2021/0216489 A1    Jul. 15, 2021

Related U.S. Application Data

(63) Continuation of application No. PCT/CN2018/109214, filed on Sep. 30, 2018.

(51) Int. Cl.
*G06F 13/42* (2006.01)
*G06F 13/40* (2006.01)

(52) U.S. Cl.
CPC ...... *G06F 13/4221* (2013.01); *G06F 13/4027* (2013.01); *G06F 2213/0026* (2013.01)

(58) Field of Classification Search
CPC .......... G06F 13/4221; G06F 13/4027; G06F 2213/0026
See application file for complete search history.

(56) References Cited

U.S. PATENT DOCUMENTS

| | | |
|---|---|---|
| 2005/0273590 A1 | 12/2005 | Chang |
| 2009/0248941 A1 | 10/2009 | Morein et al. |
| 2012/0254587 A1* | 10/2012 | Biran ............... G06F 9/3877 712/34 |
| 2014/0333634 A1 | 11/2014 | Kanda |
| 2015/0212934 A1* | 7/2015 | Shanmugam ....... G06F 9/46 711/154 |

(Continued)

FOREIGN PATENT DOCUMENTS

| | | |
|---|---|---|
| CN | 101046724 A | 10/2007 |
| CN | 103631671 A | 3/2014 |

(Continued)

OTHER PUBLICATIONS

Extended European Search Report issued in European Application No. 18935362.6 dated Sep. 27, 2021, 8 pages.

(Continued)

*Primary Examiner* — Nimesh G Patel
(74) *Attorney, Agent, or Firm* — Fish & Richardson P.C.

(57) ABSTRACT

Examples in this application disclose an operation accelerator, a switch, and a processing system. One example operation accelerator includes a shunt circuit directly connected to a first peripheral component interconnect express (PCIe) device through a PCIe link. The shunt circuit is configured to receive first data sent by the first PCIe device through the PCIe link, and transmit the first data through an internal bus. A first address carried in the first data is located in a first range. In some examples of this application, the first PCIe device directly communicates with the operation accelerator through the shunt circuit in the operation accelerator.

16 Claims, 11 Drawing Sheets

(56) References Cited

U.S. PATENT DOCUMENTS

| | | | |
|---|---|---|---|
| 2019/0243571 A1* | 8/2019 | Narayanan | G06F 3/0646 |
| 2020/0081850 A1* | 3/2020 | Singh | G06F 13/404 |
| 2021/0311633 A1* | 10/2021 | Bates | G06F 13/1668 |

FOREIGN PATENT DOCUMENTS

| | | |
|---|---|---|
| CN | 103714039 A | 4/2014 |
| CN | 104102579 A | 10/2014 |

OTHER PUBLICATIONS

PCT International Search Report and Written Opinion issued in International Application No. PCT/CN2018/109214 dated Jul. 2, 2019, 17 pages (with English translation).

* cited by examiner

OPERATION ACCELERATOR, SWITCH, TASK SCHEDULING METHOD, AND PROCESSING SYSTEM

CROSS-REFERENCE TO RELATED APPLICATIONS

This application is a continuation of International Application No. PCT/CN2018/109214, filed on Sep. 30, 2018, the disclosure of which is hereby incorporated by reference in its entirety.

TECHNICAL FIELD

This application relates to the field of computer technologies, and in particular, to an operation accelerator, a switch, a task scheduling method, and a processing system.

BACKGROUND

A central processing unit (CPU) of a host, namely, a host CPU, is a processor that runs an operating system, a device driver, and an application. An external device of the host CPU may be connected to an operation accelerator to improve a computing capability of the host CPU, may be connected to a network controller to perform external communication, and may be connected to a storage medium access controller to access block data. The host CPU is a center of a system. The operation accelerator is a component that has a stronger computing capability on a specific task, such as a graphics processing unit (GPU), an application-specific integrated circuit (ASIC), a field-programmable gate array (FPGA), or an artificial intelligence (AI) chip. The network controller refers to a controller that performs external data exchange through an Ethernet, an InfiniBand, or the like. The storage medium access controller is a controller that accesses block data stored in a medium such as hard disk drive (HDD), a solid state drive (SSD), or a storage class memory (SCM) on a computer.

In a computing system, an operation accelerator is added to complete a specific task, to enhance performance of the computing system to process the specific task. Currently, this becomes a widely used solution. In an actual application, a plurality of operation accelerators are connected to the CPU through a peripheral component interconnect express (PCIe) link. In this configuration, a user performs programming on the CPU, and a programming framework delivers a task to the operation accelerator through a driver, and schedules the operation accelerator to use a storage resource and a network resource to complete the corresponding task. For example, when an operation accelerator needs to communicate with another external node during execution of a task, a CPU-side programming framework receives data transmitted by a network controller in a main memory, and then invokes an operation accelerator unit to obtain the data from the main memory, to complete a communication process. The network controller, the storage medium access controller, and the operation accelerator all communicate with the CPU through the PCIe link.

In the foregoing solution, communication among PCIe devices such as the operation accelerator, the network controller and the storage medium access controller is performed through a common PCIe link. Consequently, severe traffic congestion occurs on the PCIe link, and the PCIe link becomes a performance bottleneck.

SUMMARY

Embodiments of this application provide an operation accelerator, a switch, a task scheduling method, and a processing system, to reduce transmission load of a PCIe link, and further avoid traffic congestion generated by the PCIe link.

According to a first aspect, an embodiment of this application provides an operation accelerator. The operation accelerator includes:

a shunt circuit directly connected to a first peripheral component interconnect express PCIe device through a PCIe link.

The shunt circuit is configured to receive first data sent by the first PCIe device through the PCIe link, and transmit the first data through an internal bus. A first address carried in the first data is located in a first range.

The first data may be an access request, a read/write request, feedback information, and other data. The first address may be a direct memory access (DMA) address mapped by a processor, in other words, an address that needs to be carried in information transmitted through the PCIe link. The shunt circuit has an address filtering function, and may translate an address located in the first address range into an internal physical address of the operation accelerator, and transmit data that carries these addresses to a component specified by the internal physical address through the internal bus. The shunt circuit is directly connected to the first PCIe device through the PCIe link, and may transmit the first data sent by the first PCIe device through the internal bus. It may be understood that, the operation accelerator may directly communicate with the first PCIe device through the PCIe link, and does not need to pass through the processor or a switch. This reduces a quantity of PCIe links that need to be passed through by the operation accelerator to complete the communication with the first PCIe device.

In this embodiment of this application, the first PCIe device directly communicates with the operation accelerator through the shunt circuit in the operation accelerator, to reduce transmission load of the PCIe link, and further avoid traffic congestion generated by the PCIe link.

In an optional implementation, the shunt circuit is further configured to send, to a processor through the PCIe link, second data sent by the first PCIe device through the PCIe link. A second address carried in the second data is located in a second range. The first range and the second range do not overlap.

The shunt circuit may implement the communication between the first PCIe device and the operation accelerator, and may also implement communication between the first PCIe device and the processor.

In this implementation, traffic on the PCIe link is directly transmitted on the internal bus (an internal memory bus) of the operation accelerator, to reduce a bandwidth conflict generated on a public PCIe link.

In an optional implementation, the shunt circuit is further configured to receive data or an instruction transmitted by the internal bus, and send the data or the instruction to the first PCIe device through the PCIe link.

In this implementation, the shunt circuit transmits the data or the instruction transmitted on the internal bus of the operation accelerator to a corresponding PCIe device through the PCIe link, to implement communication between the operation accelerator and the PCIe device. This ensures high transmission efficiency.

In an optional implementation, the shunt circuit includes a first address translator and the first PCIe device. The first address translator and the first PCIe device are connected through the PCIe link.

The first address translator is configured to receive the first data sent by the first PCIe device, and after translating the first address into the internal physical address, transmit the first data through the internal bus.

In this implementation, the first address translator sends the first data to a corresponding component through the internal bus based on the address of the first data sent by the first PCIe device. This facilitates simple implementation.

In an optional implementation, the first address translator is further configured to transmit the second data sent by the first PCIe device to the processor through the PCIe link.

It may be understood that, data that carries an address that is located in the first range is the data sent by the first PCIe device to the operation accelerator. Data that carries an address that is not located in the first range is the data sent by the first PCIe device to the processor. The first address translator may transmit the data sent by the first PCIe device through different transmission paths based on the address carried in the data sent by the first PCIe device. In addition, the first address translator may further translate a DMA address sent by the PCIe device into the internal physical address of the operation accelerator, and further transmit the data that carries these addresses to the component specified by the internal physical address through the internal bus.

In this implementation, the first address translator sends data that carries an address that is located in the second range to the processor through the PCIe link. This facilitates simple implementation.

In an optional implementation, the shunt circuit further includes a second address translator and a first PCIe downstream interface.

The first PCIe downstream interface is configured to receive third data sent by a second PCIe device through the PCIe link, and send the third data to the second address translator. A third address carried in the third data is located in the first range. The second PCIe device is an external device of the operation accelerator.

The second address translator is configured to translate the third address, and transmit the third data through the internal bus.

The first PCIe downstream interface is directly connected to the second PCIe device through the PCIe link. The second address translator may translate an address located in the first range into the internal physical address of the operation accelerator, and does not process an address in the second range.

In this implementation, the operation accelerator directly communicates with the second PCIe device through the internal first PCIe downstream interface. This ensures high communication efficiency.

In an optional implementation, the shunt circuit further includes a virtual PCI-PCI bridge.

The first PCIe downstream interface is further configured to receive fourth data sent by the second PCIe device through the PCIe link, and send the fourth data to the second address translator. A fourth address carried in the fourth data is located in the second range.

The second address translator is further configured to transmit the fourth data to the virtual PCI-PCI through the PCIe link.

The virtual PCI-PCI is configured to transmit the fourth data to the processor through the PCIe link.

The shunt circuit may implement communication between the second PCIe device and the operation accelerator, and may also implement communication between the second PCIe device and the processor. The shunt circuit may accurately determine whether the second PCIe device sends data to the acceleration operator or the processor.

In this implementation, the traffic on the PCIe link is directly transmitted on the internal bus (the internal memory bus) of the operation accelerator, to reduce the bandwidth conflict generated on the public PCIe link.

In an optional implementation, the shunt circuit includes a third address translator and a second PCIe downstream interface.

The second PCIe downstream interface is configured to receive the first data sent by the first PCIe device through the PCIe link, and send the first data to the third address translator.

The third address translator is configured to: after translating the first address into an internal physical address, transmit the first data through the internal bus.

In this implementation, after translating the address of the first data sent by the first PCIe device into the internal physical address, the third address translator sends the first data to a corresponding component through the internal bus. This facilitates simple implementation.

In an optional implementation, the shunt circuit further includes a virtual PCI-PCI bridge.

The second PCIe downstream interface is further configured to send the second data to the third address translator.

The third address translator is further configured to transmit the second data to the virtual PCI-PCI through the PCIe link.

The virtual PCI-PCI is configured to transmit the second data to the processor through the PCIe link.

In this implementation, the third address translator sends data that carries an address that is located in the second range to the processor through the PCIe link. This facilitates simple implementation.

In an optional implementation, the operation accelerator further includes a task scheduler.

The task scheduler is configured to receive at least two subtasks sent by the processor, and store the at least two subtasks in a buffer. A first subtask in the at least two subtasks needs to be executed after a second subtask is completed.

The task scheduler is further configured to: after the first subtask is completed, transmit a target instruction to the shunt circuit through the internal bus. The target instruction is used to instruct a third PCIe device to execute the second subtask.

The shunt circuit is configured to send the target instruction to the third PCIe device through the PCIe link. The third PCIe device is directly connected to the shunt circuit through the PCIe link.

The task scheduler may directly notify each component or the PCIe device to execute a corresponding subtask without passing through the processor. The PCIe device may directly receive the data or the instruction from the operation accelerator, or may directly send the data or the instruction to the operation accelerator. The at least two subtasks are subtasks that are allocated by the processor to the acceleration operator for execution.

In this implementation, the operation accelerator automatically starts the subtasks based on completion statuses of subtasks that are dependent on each other, without participation of the processor, to reduce a work delay.

In an optional implementation, the task scheduler is further configured to submit the second subtask to a target task queue in the buffer. The target task queue is a task queue to be executed by the third PCIe device.

The second subtask may be a communication subtask, a computing subtask, or a storage subtask. The communication subtask may be a task that needs to be executed by a network controller. The computing subtask may be a task that needs to be executed by a computing unit in the computing accelerator. The storage subtask may be a task that needs to be executed by a storage medium access controller. When the second subtask is the communication subtask, the second subtask is submitted to a communication task queue (the target task queue), and the third PCIe device may be the network controller. When the second subtask is the storage subtask, the second subtask is submitted to a storage task queue (the target task queue), and the third PCIe device may be the storage medium access controller. Optionally, after determining that the first subtask is completed, the task scheduler submits the second subtask to the target task queue in the buffer.

In this implementation, the task scheduler submits the second subtask to the task queue to be executed by the third PCIe device, so that the PCIe device obtains the subtask in time.

In an optional implementation, the shunt circuit is further configured to receive a completion instruction sent by the third PCIe device through the PCIe link, and send the completion instruction to the task scheduler through the internal bus. The completion instruction is used to instruct that the second subtask is completed.

The task scheduler is further configured to: after receiving the completion instruction, schedule the computing unit or a fourth PCIe device to execute a third subtask. The third subtask needs to be executed after the second subtask is completed. The computing unit is a component that is in the operation accelerator and that is configured to execute the third subtask.

In this implementation, the operation accelerator automatically starts the subtasks based on the completion statuses of the subtasks that are dependent on each other, without the participation of the processor, to reduce the work delay.

According to a second aspect, an embodiment of this application provides a switch. The switch includes:

a shunt circuit directly connected to a first peripheral component interconnect express PCIe device through a PCIe link. The shunt circuit is directly connected to an operation accelerator through a memory bus.

The shunt circuit is configured to receive first data sent by the first PCIe device through the PCIe link, and send the first data to the operation accelerator through the memory bus. A first address carried in the first data is located in a first range.

The shunt circuit may translate the first data sent by the first PCIe through the PCIe link into data that can be transmitted on the memory bus, and then transmit the data to the operation accelerator. It may be understood that the shunt circuit may send the data to the operation accelerator through the memory bus, without using the PCIe link, to reduce transmission load of the PCIe link.

In this embodiment of this application, the shunt circuit implements communication between the first PCIe device and the acceleration operator, to reduce the transmission load of the PCIe link, and further avoid traffic congestion of the PCIe link.

In an optional implementation, the shunt circuit is further configured to receive second data sent by the first PCIe device through the PCIe link, and send the second data to a processor through the PCIe link. A second address carried in the second data is located in a second range. The first range and the second range do not overlap.

In this implementation, the shunt circuit may implement communication between the first PCIe device and the processor, and may also implement the communication between the first PCIe device and the operation accelerator. This facilitates simple implementation.

In an optional implementation, the shunt circuit is further configured to receive data or an instruction from the operation accelerator through an internal bus, and send the data or the instruction to the first PCIe device through the PCIe link.

In this implementation, the shunt circuit receives the data or the instruction transmitted by the operation accelerator through the memory bus, and transmits the data or the instruction to a corresponding PCIe device through the PCIe link, to implement communication between the operation accelerator and the PCIe device. This ensures high transmission efficiency.

In an optional implementation, the shunt circuit includes a first address translator and the first PCIe device. The first address translator and the first PCIe device are connected through the PCIe link.

The first address translator is configured to receive the first data sent by the first PCIe device through the PCIe link, and after translating the first address into a local physical address, send the first data to the operation accelerator through the memory bus. The local physical address is used to access the operation accelerator.

In this implementation, the first address translator sends the first data to a corresponding component through the internal bus based on the address of the first data sent by the first PCIe device. This facilitates simple implementation.

In an optional implementation, the first address translator is further configured to transmit the second data sent by the first PCIe device to the processor through the PCIe link.

In this implementation, the first address translator sends data that carries an address that is located in the second range to the processor through the PCIe link. This facilitates simple implementation.

In an optional implementation, the shunt circuit further includes a second address translator and a first PCIe downstream interface.

The first PCIe downstream interface is configured to receive third data sent by a second PCIe device through the PCIe link, and send the third data to the second address translator. A third address carried in the third data is located in the first range. The second PCIe device is an external device of the switch.

The second address translator is configured to translate the third address, and send the third data to the operation accelerator through the memory bus.

In this implementation, the second PCIe device communicates with the operation accelerator through the first PCIe downstream interface in the switch. This implements the high communication efficiency.

In an optional implementation, the shunt circuit further includes a virtual PCI-PCI bridge.

The first PCIe downstream interface is further configured to receive fourth data sent by the second PCIe device through the PCIe link, and send the fourth data to the second address translator. A fourth address carried in the fourth data is located in the second range.

The second address translator is further configured to transmit the fourth data to the virtual PCI-PCI through the PCIe link.

The virtual PCI-PCI is configured to transmit the fourth data to the processor through the PCIe link.

In this implementation, traffic on the PCIe link is directly transmitted in the switch, to reduce a bandwidth conflict generated on a public PCIe link.

In an optional implementation, the shunt circuit includes a third address translator and a second PCIe downstream interface.

The second PCIe downstream interface is configured to receive the first data sent by the first PCIe device through the PCIe link, and send the first data to the third address translator.

The third address translator is configured to: after translating the first address into a local physical address, send the first data to the operation accelerator through the memory bus. The local physical address is used to access the operation accelerator.

In this implementation, the third address translator sends the first data to the operation accelerator through the memory bus based on the address of the first data sent by the first PCIe device. This facilitates simple implementation.

In an optional implementation, the shunt circuit further includes a virtual PCI-PCI bridge.

The second PCIe downstream interface is further configured to send the second data to the third address translator.

The third address translator is further configured to transmit the second data to the virtual PCI-PCI through the PCIe link.

The virtual PCI-PCI is configured to transmit the second data to the processor through the PCIe link.

In this implementation, the third address translator sends the second data to the processor through the PCIe link based on the address of the second data sent by the first PCIe device. This facilitates simple implementation.

According to a third aspect, an embodiment of this application provides a task scheduling method. The method includes:

An operation accelerator stores at least two subtasks from a processor into a first buffer. A second subtask in the at least two subtasks needs to be executed after a first subtask is completed.

After the first subtask is completed, the operation accelerator sends a target instruction to a target device. The target instruction is used to instruct the target device to execute the second subtask.

In this embodiment of this application, the operation accelerator may directly schedule the target device to execute a corresponding task, without participation of the processor. This improves scheduling efficiency.

In an optional implementation, after the operation accelerator stores the at least two subtasks from the processor into the first buffer, the method further includes:

The operation accelerator submits the second subtask to a target task queue in a second buffer. The target task queue is a task queue to be executed by a third PCIe device.

Optionally, after the first subtask is completed, the operation accelerator submits the second subtask to the target task queue in the second buffer. The second buffer is a buffer in the operation accelerator, namely, a local buffer.

In this implementation, the operation accelerator may submit the second subtask to a corresponding task queue in time, to ensure that the task can be quickly processed.

According to a fourth aspect, an embodiment of this application provides an operation accelerator. The operation accelerator includes:

a first buffer, configured to store at least two subtasks from a processor, where a second subtask in the at least two subtasks needs to be executed after a first subtask is completed; and a sending unit, configured to send a target instruction to a target device after the first subtask is completed, where the target instruction is used to instruct the target device to execute the second subtask.

In this embodiment of this application, the operation accelerator may directly schedule the target device to execute a corresponding task, without participation of the processor. This improves scheduling efficiency.

In an optional implementation, the sending unit is further configured to submit the second subtask to a target task queue in a second buffer. The target task queue is a task queue to be executed by a third PCIe device.

In this implementation, the operation accelerator may submit the second subtask to a corresponding task queue in time, to ensure that the task can be quickly processed.

According to a fifth aspect, an embodiment of this application provides a processing system, including a processor, and the switch and the operation accelerator in the second aspect. The processor is configured to control the switch and the operation accelerator.

According to a sixth aspect, an embodiment of this application provides a computer-readable storage medium. The computer storage medium stores a computer program, and the computer program includes a program instruction. When the program instruction is executed by a processor, the processor is enabled to perform the method according to the third aspect.

DESCRIPTION OF EMBODIMENTS

Terms used in implementations of this application are merely used to explain specific embodiments of this application, and are not intended to limit this application. The following first describes terms and related knowledge in this application.

PCIe is a high-speed serial computer extended bus standard, and is used for high-speed serial point-to-point dual-channel high-bandwidth transmission. A PCIe link uses an end-to-end data transmission mode. On one PCIe link, two ports are equivalent, and are separately connected to a transmit device and a receive device. In addition, one end of one PCIe link can be connected to only one transmit device or one receive device. A basic structure of a PCIe bus includes a root complex, a switch, and various endpoints. The root complex may be integrated in a northbridge chip, and is used for connection between a processor and a memory subsystem and an I/O device. A function of the switch is usually provided in a form of software. The switch includes two or more logical PCI-to-PCI connection bridges (PCI-PCI bridge), to maintain compatibility with an existing PCI. A main function of the PCIe switch is to interconnect PCIe devices. There are a plurality of PCI device slots on the PCI bus. When the PCI slots cannot meet a requirement, the PCI device can be extended through the PCI bridge. One PCI bridge connects one PCI bus to one PCI slot as one device of the PCI.

Figure 1:
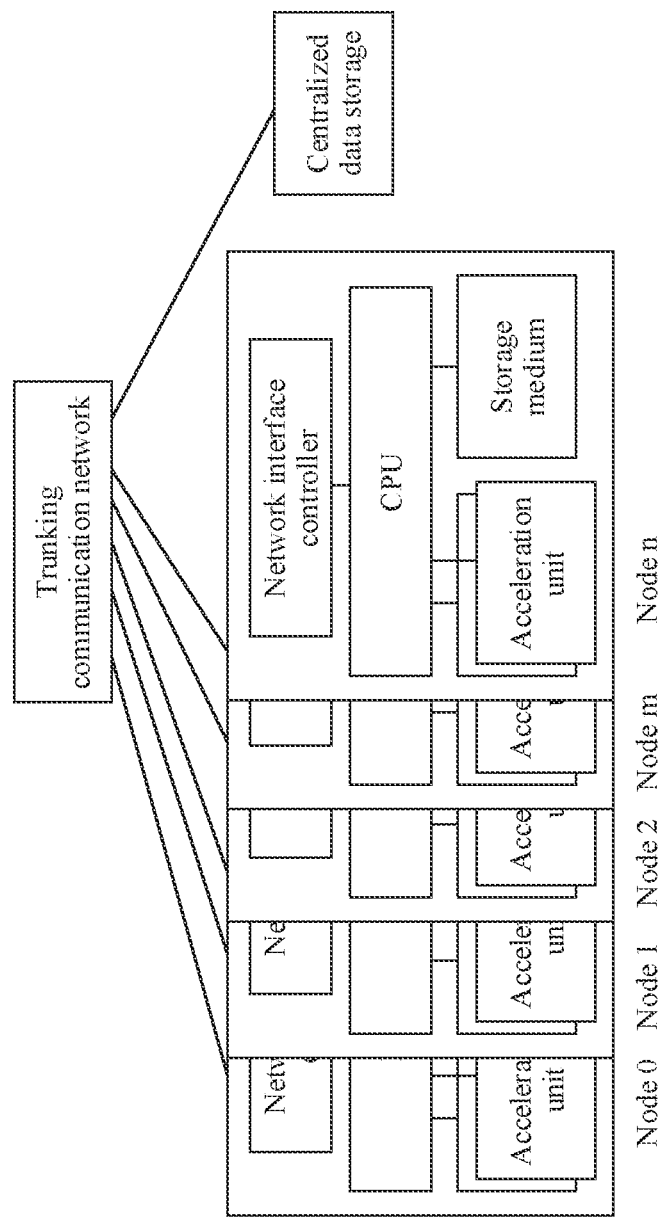
FIG. 1 is a schematic diagram of a trunking communication network according to an embodiment of this application.

A trunking communication system is a computer system tin which a group of loosely integrated computer software and/or a group of connected hardware highly collaboratively perform computing tasks. In a sense, the group of computer software and/or the group of hardware can be considered as a computer. A single computer in the trunking system is usually referred to as a node, and is usually connected via a local area network, or in another possible manner. A trunking computer is usually used to improve computing speed and/or reliability of the single computer. FIG. 1 is a schematic diagram of a trunking communication network according to an embodiment of this application. As shown in FIG. 1, the trunking communication network includes n nodes, and the nodes work in parallel. An operation accelerator on each node is controlled by a host CPU on the node through programming, and communicates with another node. The operation accelerator uses each node to locally or centrally store data in devices. Each node in FIG. 1 may be considered as a computer device. The trunking communication network in FIG. 1 is mainly used in scenarios such as AI computing, heterogeneous parallel computing, and high-performance computing.

Figure 2:
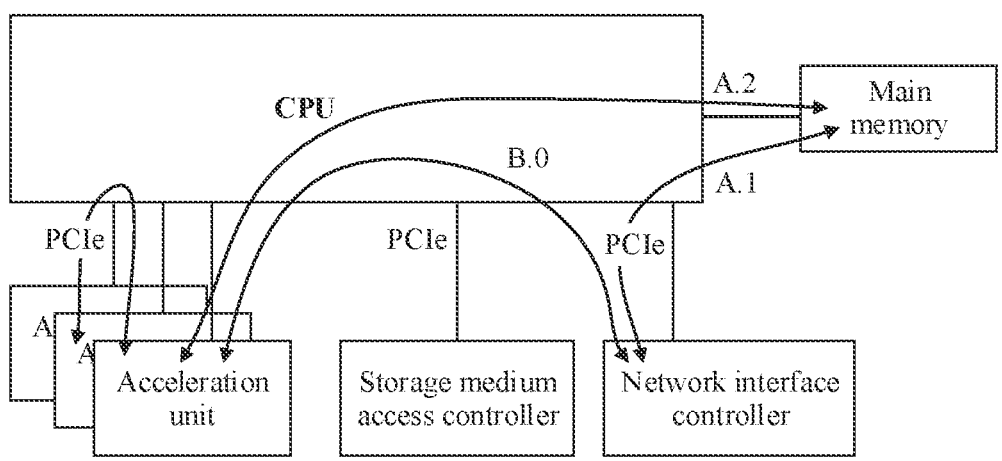
FIG. 2 is a schematic diagram of an architecture of a computer device according to an embodiment of this application.

The following describes a schematic diagram of an architecture of the node (the computer device) in FIG. 1. FIG. 2 is a schematic diagram of an architecture of a computer device according to an embodiment of this application. As shown in FIG. 2, operation accelerators, a storage medium access controller, and a network controller are all connected to the host CPU through a PCIe link. The operation accelerators are connected to each other through the PCIe link, and the operation accelerator is connected to the network controller through the PCIe link. By using the architecture shown in FIG. 1, a user performs the programming on the host CPU. A programming framework delivers a task to the operation accelerator through a driver, and schedules the operation accelerator to use storage resources and network resources. For example, in FIG. 1, when the operation accelerator needs to communicate with another external node, the host CPU receives data in a main memory (a path A.1 in FIG. 1), and then invokes the operation accelerator to obtain the data from the main memory (a path A.2 in FIG. 1), to complete a communication process. To improve access bandwidth between the operation accelerator and the storage medium access controller and between the operation accelerator and the network controller, in a system solution design, a peer-to-peer mode is usually used for direct data transmission, as shown in path B.0 in FIG. 1.

Figure 3:
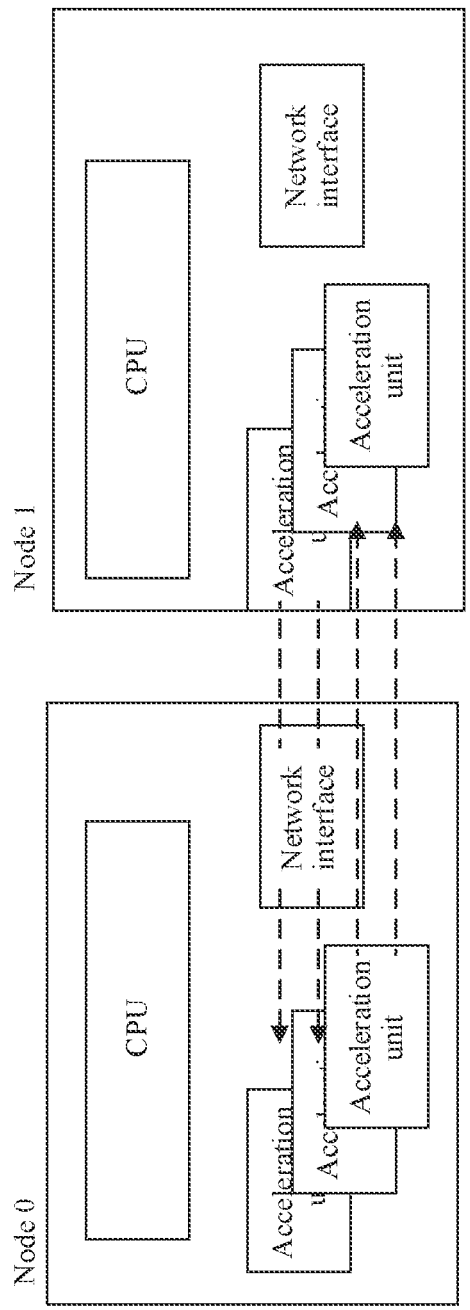
FIG. 3 is a schematic diagram of communication between nodes according to an embodiment of this application.

FIG. 2 mainly shows a communication mode between different components included in a same computer device, for example, a communication mode between the operation accelerator and the network controller. The following describes a communication mode between different nodes. FIG. 3 is a schematic diagram of communication between nodes according to an embodiment of this application. As shown in FIG. 3, when a plurality of nodes perform parallel computing, the nodes execute tasks in parallel, and communicate with each other and perform synchronization via a communication network. Completion time of an entire task consists of time for the operation accelerators to complete computing and time for communication between the operation accelerators. Communication bandwidth and delay directly affect performance of completing the parallel computing task. In a parallel computing scenario, a large task may usually be divided into a data obtaining part, a computing part, and a communication part. The communication part is used for the synchronization between the plurality of nodes, namely, data transmission between the nodes. A plurality of subtasks obtained by splitting the large task may be executed in sequence.

Figure 4:
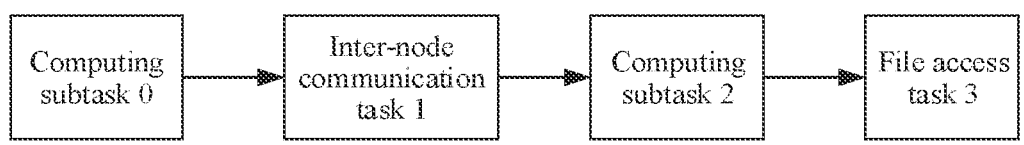
FIG. 4 is a schematic diagram of a subtask execution sequence according to an embodiment of this application.

FIG. 4 is a schematic diagram of a subtask execution sequence according to an embodiment of this application. As shown in FIG. 4, after a "computing subtask 0" is completed and an intermediate computation result is obtained, an "inter-node communication task 1" is started. After the "inter-node communication task 1" is completed, a "computing subtask 2" is executed. After the "computing subtask 2" is completed, a "file access task 3" is executed. In other words, the "inter-node communication task 1" can be started only after the "computing subtask 0" is completed. For example, in a computation process of a neural network, after computation iteration of a part of the network is completed, communication is performed between a plurality of nodes to complete network parameter update.

Figure 5:
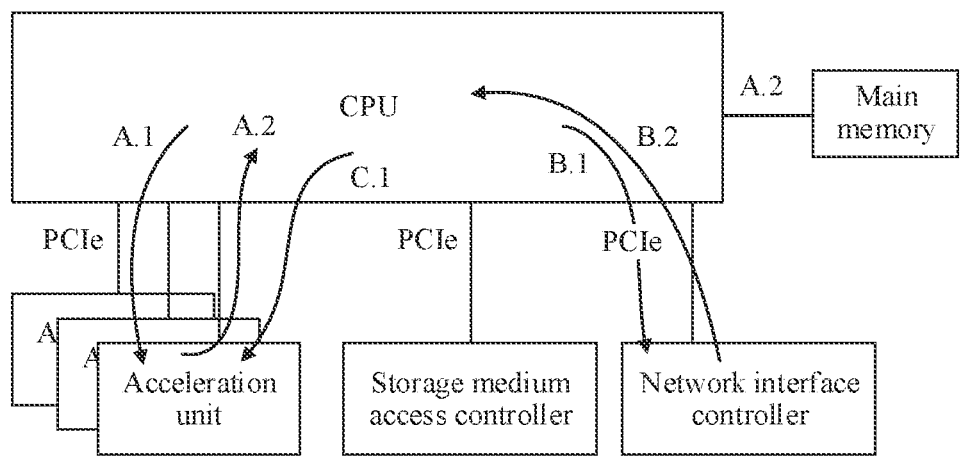
FIG. 5 is a schematic diagram of another subtask execution sequence according to an embodiment of this application.

FIG. 5 is a schematic diagram of another subtask execution sequence according to an embodiment of this application. A working process of the first three steps (the computing subtask 0, the inter-node communication task 1, and the computing subtask 2) in FIG. 4 is marked in FIG. 5, and main steps are described as follows:

A.1: The host CPU delivers the computing subtask 0 to the operation accelerator.

A.2: After completing the computing subtask 0, the operation accelerator notifies the host CPU that the computing subtask 0 is completed.

B.1: The host CPU delivers the inter-node communication task 1 to the network controller, for example, implementing data migration between the operation accelerator and another node.

B.2: After the inter-node communication task 1 is completed, the network controller returns a communication completion event to the host CPU.

C.1: The host CPU re-delivers the computing subtask 2 to the operation accelerator based on a communication result.

It can be learned from FIG. 5 that data is transmitted between the CPU and the operation accelerator, the network controller, and the storage medium access controller through a same PCIe link. Therefore, the PCIe link causes severe traffic congestion and becomes a performance bottleneck. In addition, because protocol stacks of network communication and the storage task are both located on the CPU, as shown in the execution sequence of the subtasks in FIG. 4, each subtask needs to be sent to the CPU for coordination and processing after being completed, causing an increase in the delay. In addition, an additional queuing delay is caused when the CPU needs to coordinate and process a large number of tasks. It can be learned that, in the foregoing solution, traffic congestion may occur on the PCIe link and a delay may be caused when the CPU coordinates and processes the subtasks.

Figure 6:
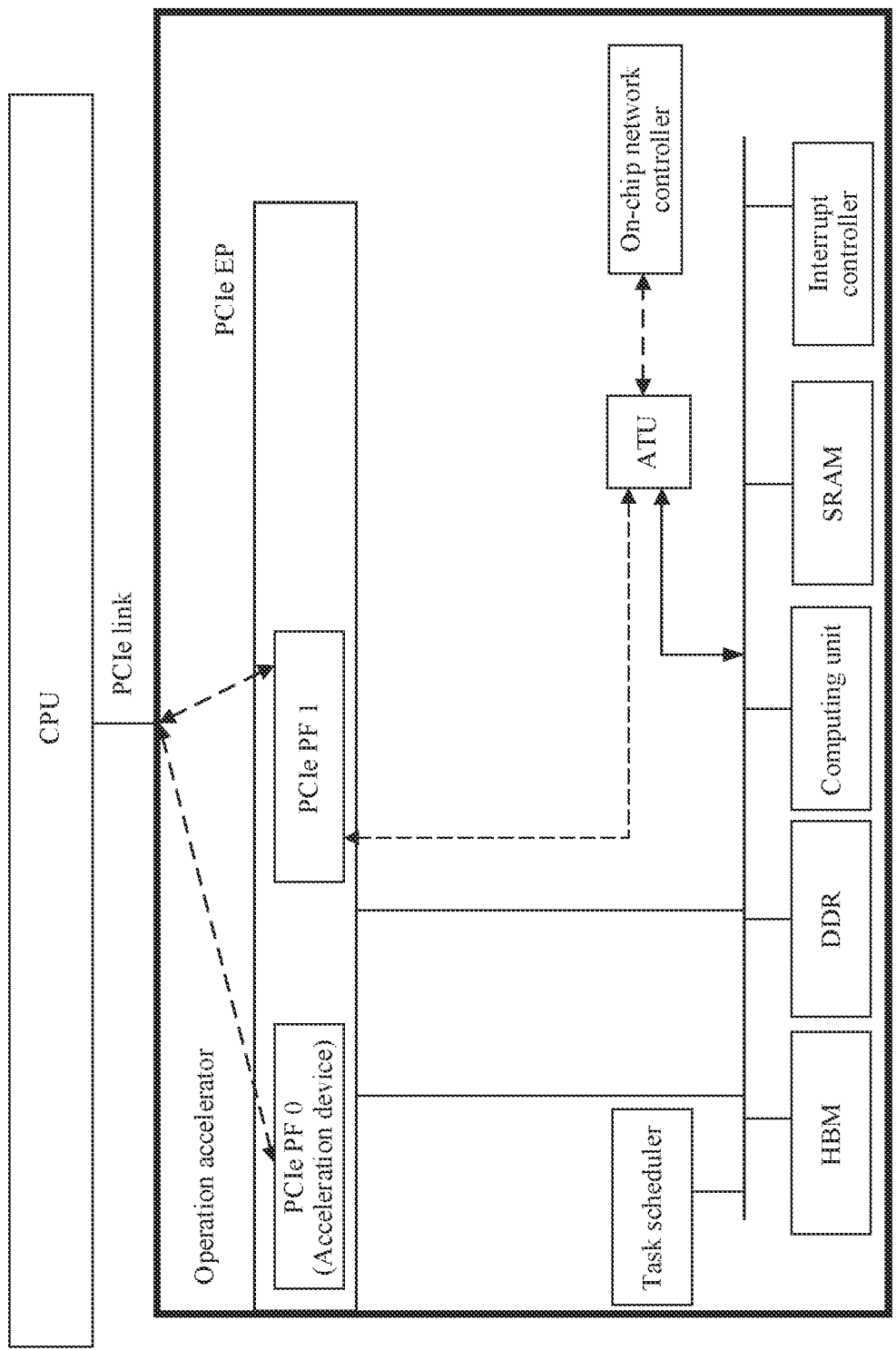
FIG. 6 is a schematic diagram of a structure of an operation accelerator according to an embodiment of this application.

FIG. 6 is a schematic diagram of a structure of an operation accelerator according to an embodiment of this application. As shown in FIG. 6, the operation accelerator is a multi-PCIe function device, and the operation accelerator is an independent functional unit and occupies one PCIe interface (for example, a PCIe PF 0 in FIG. 6). An on-chip network controller integrated in the operation accelerator is an independent PCIe device, and occupies one PCIe interface (for example, a PCIe PF 1 in FIG. 6).

The following describes functions of components in FIG. 6 and a communication mode between the components.

An address translator, namely, the ATU in FIG. 6, is configured to translate a DMA address in a first range into an internal bus address of the operation accelerator. Specifically, the address translator is configured to receive data sent by a PCIe device (for example, the on-chip network controller in FIG. 6) through a PCIe link. When an address carried in the data is located in the first range, the address translator translates the address into an internal physical address, and then transmits the data through an internal bus. When an address carried in the data is not located in the first range, the address translator sends the data to a CPU through the PCIe link. In FIG. 6, a solid line represents the internal bus, and a dashed line represents the PCIe link. The PCIe link transmits the DMA address, and the internal bus transmits the internal physical address. It may be understood that the address translator may implement a data splitting function, in other words, split data or an instruction sent by the PCIe device. As shown in FIG. 6, the address translator may send the data or the instruction sent by the on-chip network controller to the CPU through the PCIe link, or may transmit the data or the instruction sent by the on-chip network controller through the internal bus.

The ATU includes a plurality of address translation entries in terms of an address translation function, and input of each address translation entry may include {a PCI requester identifier (ID), a PCI process address space identifier (PASID), a DMA address range, and a memory access permission}. For a matched address (an address in the first range), the matched address is translated into the internal physical address of the operation accelerator. For a missed address (an address in a second range), information of (the PCIe requester ID, the PASID, and a complete 64-bit DMA address) that is originally input is carried and transmitted on an internal memory access interconnect bus (the internal physical bus) of the operation accelerator. When the internal physical address of the operation accelerator is less than 64 bits, an extra part of the 64-bit DMA address is transmitted by multiplexing unused fields of the internal bus or extending a bit width. The ATU translates the DMA address to the internal physical address of the operation accelerator, and determines whether access is directly implemented on the internal physical bus of the operation accelerator.

The PCIe PF 0 and the PCIe PF 1 are both hardware functional modules. PF (Physical Function) is a common term used in PCIe, and is a function granularity for a host management device. The PCIe PF 0 and the PCIe PF 1 in FIG. 6 are both functional modules on a PCIe EP. A link between the PCIe PF 0 and the CPU and a link between the PCIe PF 1 and the CPU in FIG. 6 are both logical links. In an actual hardware structure, there is only one link between the PCIe EP and the internal bus of the operation accelerator, and there is only one PCIe link between the PCIe EP and the CPU. In other words, the PCIe PF 0 and the PCIe PF 1 share a same PCIe link.

A high bandwidth memory (HBM), a double data rate synchronous dynamic random access memory (DDR), and a static random access memory (SRAM) are all memories in the operation accelerator, and are configured to store the data or the instruction.

A task scheduler (a processor) is configured to control each component in the operation accelerator. A computing unit is configured to process a computing task delivered by the CPU to the operation accelerator. An interrupt controller is used to execute an interrupt handler and implement various interrupt operations.

The operation accelerator may be mounted to the CPU, to improve performance of the CPU to process a specific task, for example, image processing.

As shown in FIG. 6, a shunt circuit in the operation accelerator includes the on-chip network controller and the ATU. The ATU is connected to the on-chip network controller through the PCIe link. The shunt circuit in the operation accelerator includes a first address translator and a first PCIe device. The first address translator (the ATU in FIG. 6) is configured to receive first data sent by the first PCIe device (the on-chip network controller in FIG. 6), translate a first address into the internal physical address, and transmit the first data through the internal bus. The first address is an address carried in the first data. The first address translator is further configured to transmit second data sent by the first PCIe device to the processor through the PCIe link. An address carried in the second data is located in the second range. It may be understood that the first address translator may translate the DMA address located in the first range into the internal physical address of the operation accelerator. A DMA address located in the second range may not be processed.

As shown in FIG. 6, a transmission path between the on-chip network controller and the CPU is a path from the on-chip network controller to the ATU, from the ATU to the PCIe PF 1, and from the PCIe PF 1 to the CPU. The data is transmitted from the on-chip network controller to the ATU, from the ATU to the PCIe PF 1, and from the PCIe PF 1 to the CPU through the PCIe link. A transmission path between the on-chip network controller and the operation accelerator is a path from the on-chip network controller to the ATU and from the ATU to the internal bus. Transmission from the network controller to the ATU is performed through the PCIe link. It can be learned from FIG. 6 that the shunt circuit in the operation accelerator may receive the first data sent by the first PCIe device (the network-on-chip controller) through the PCIe link, and transmit the first data through the internal bus. Alternatively, the shunt circuit may send, to the processor through the PCIe link, the second data sent by the first PCIe device through the PCIe link. Alternatively, the shunt circuit may receive the data or the instruction transmitted through the internal bus, and send the data or the instruction to the first PCIe device through the PCIe link. It may be understood that at least one PCIe device is integrated into the operation accelerator, and communication between the at least one PCIe device and the operation accelerator and communication between the at least one PCIe device and the CPU are implemented by using the address translator. In this way, traffic on the PCIe link may be directly transmitted on the internal bus of the operation accelerator, to reduce a bandwidth conflict generated on a public PCIe link.

FIG. 6 is merely a specific example of the operation accelerator according to an embodiment of this application, and should not be considered as a unique structure of the operation accelerator. In this embodiment of this application, only the shunt circuit in the operation accelerator is indispensable, and another component in the operation accelerator is not limited. For example, the operation accelerator may not include the HBM or the DDR. It may be understood that, in this embodiment of this application, a shunt system in the operation accelerator includes the at least one PCIe device and an address translator corresponding to the at least one PCIe device. For example, the shunt system in the operation accelerator may include the on-chip network controller, a storage medium access controller, the address translator corresponding to the on-chip network controller, and an address translator of the storage medium access controller.

Figure 7:
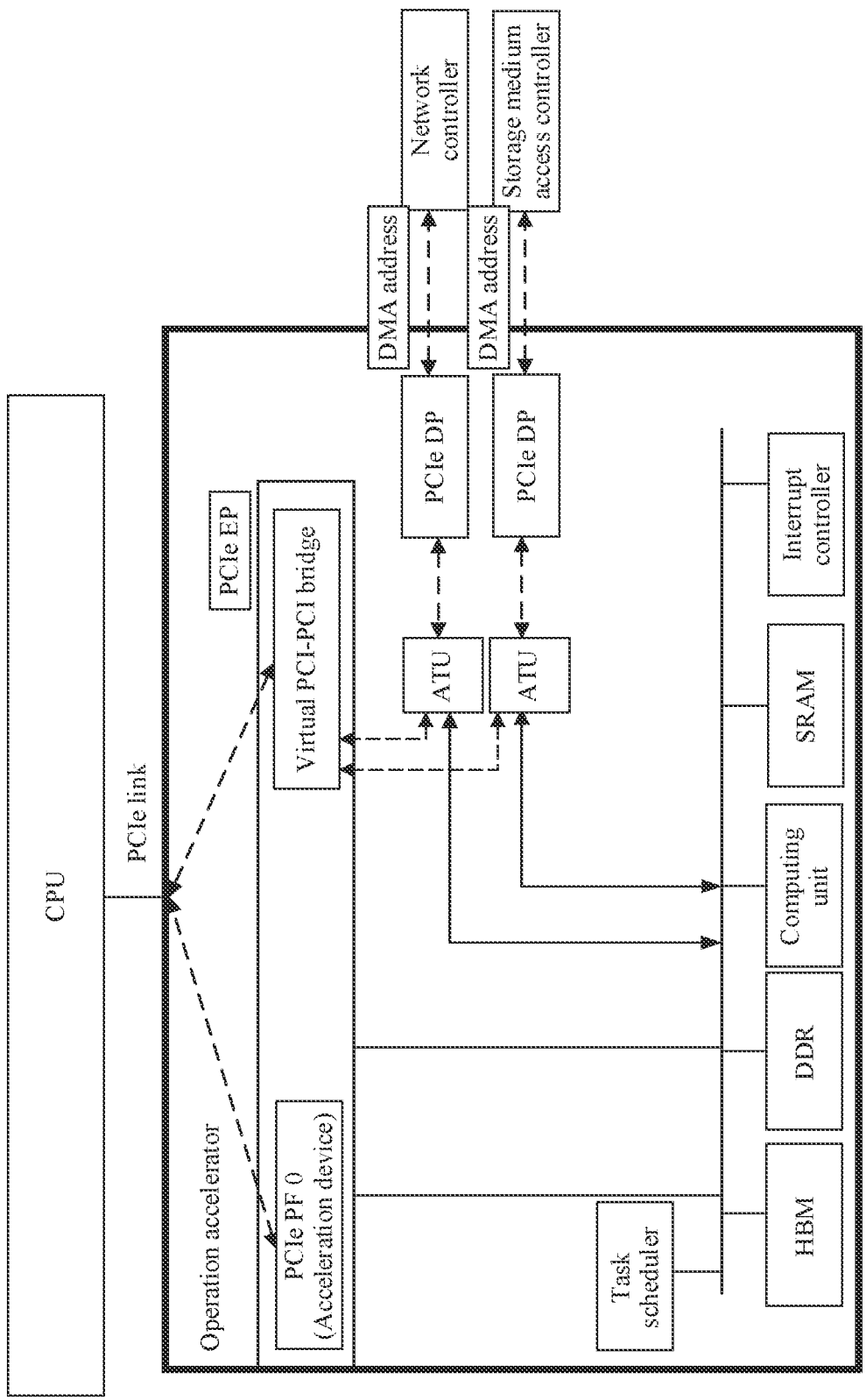
FIG. 7 is a schematic diagram of a structure of an operation accelerator according to another embodiment of this application.

FIG. 7 is a schematic diagram of a structure of an operation accelerator according to another embodiment of this application. As shown in FIG. 7, the operation accelerator is a multi-PCIe function device, and the operation accelerator is an independent functional unit (for example, a PCIe PF 0 in FIG. 7). A virtual PCI-PCI bridge is disposed on a PCIe endpoint (EP). Another PCIe device extended through a PCIe link is logically a device mounted to the PCI-PCI bridge. The PCIe PF 0 and the virtual PCI-PCI bridge in FIG. 7 are both functional modules on the PCIe EP A link between the PCIe PF 0 and a CPU and a link between the virtual PCI-PCI bridge and the CPU in FIG. 7 are both logical links. In an actual hardware structure, there is only one link between the PCIe EP and an internal bus of the operation accelerator, and there is only one PCIe link between the PCIe EP and the CPU. That is, the PCIe PF 0 and the virtual PCI-PCI bridge share one PCIe link.

In the example shown in FIG. 7, a generated PCI device topology structure is as follows: PCI bus x: device 0: computing engine (computing unit) of the operation accelerator: Device 1: Virtual PCI-PCI bridge: PCI bus y: external network controller, PCI bus z: external storage medium access controller.

The shunt circuit in FIG. 7 includes an ATU, a PCIe DP, and the virtual PCI-PCI. The PCIe DP is configured to receive data or an instruction sent by an external PCIe device through the PCIe link, and send the data or the instruction to an address translator. The external PCIe device refers to a PCIe device outside the operation accelerator. A function of the ATU in FIG. 7 is similar to the function of the ATU in FIG. 6. Details are not described herein again. It can be learned by comparing FIG. 7 and FIG. 6 that, a difference between the operation accelerator in FIG. 7 and the operation accelerator in FIG. 6 lies only in that the shunt circuit is different, and other components are the same. Therefore, another component other than the shunt circuit in the operation accelerator in FIG. 7 are not described herein. In FIG. 7, the virtual PCI-PCI bridge is a PCIe interface, and communicates with the CPU through the PCIe link. The virtual PCI-PCI bridge is a PCIe interface occupied by the external PCIe device (a network controller and a storage medium access controller). As shown in FIG. 7, a transmission path between the network controller and the CPU is a path from the network controller to the PCIe DP, from the PCIe DP to the ATU, from the ATU to the virtual PCI-PCI bridge, and from the virtual PCI-PCI bridge to the CPU. An entire transmission process is implemented through the PCIe link. A transmission path between the network controller and the operation accelerator is a path from the network controller to the PCIe DP, from the PCIe DP to the ATU, and from the ATU to the internal bus. Transmission from the network controller to the PCIe DP and transmission from the PCIe DP to the ATU are performed through the PCIe link.

It can be learned from FIG. 7 that the shunt circuit in the operation accelerator may receive first data sent by a first PCIe device (the network controller or the storage medium access controller) through the PCIe link, and transmit the first data through the internal bus. Alternatively, the shunt circuit may send, to a processor through the PCIe link, second data sent by the first PCIe device through the PCIe link. Alternatively, the shunt circuit may receive the data or the instruction transmitted through the internal bus, and send the data or the instruction to the first PCIe device through the PCIe link.

For example, the first PCIe device is the network controller, a second PCIe downstream interface is a PCIe DP connected to the network controller through the PCIe link, and a third address translator is an address translator connected to the second PCIe downstream interface. It can be learned from FIG. 7 that the second PCIe downstream interface (the PCIe DP connected to the network controller through the PCIe link) may receive the first data sent by the first PCIe device (the network controller) through the PCIe link, and send the first data to the third address translator (the address translator connected to the second PCIe downstream interface). After translating the first address into an internal physical address, the third address translator may transmit the first data through the internal bus. It can be further learned from FIG. 7 that, the second PCIe downstream interface may send the second data to the third address translator. The third address translator may transmit the second data to the virtual PCI-PCI through the PCIe link. The virtual PCI-PCI is configured to transmit the second data to the processor through the PCIe link. In this embodiment of this application, the shunt circuit in the operation accelerator may implement communication between the external PCIe device and the operation accelerator and communication between the external PCIe device and the CPU. In this way, traffic on the PCIe link may be directly transmitted on the internal bus of the operation accelerator, to reduce a bandwidth conflict generated on a public PCIe link.

It may be understood that, in this embodiment of this application, a shunt system in the operation accelerator includes at least one PCIe downstream interface, the virtual PCI-PCI bridge, and an address translator connected to the at least one PCIe downstream interface. For example, the shunt system in the operation accelerator may include three address translators, the virtual PCI-PCI bridge, and three PCIe downstream interfaces connected to the three address translators. Each address translator is connected to one PCIe downstream interface.

Figure 8:
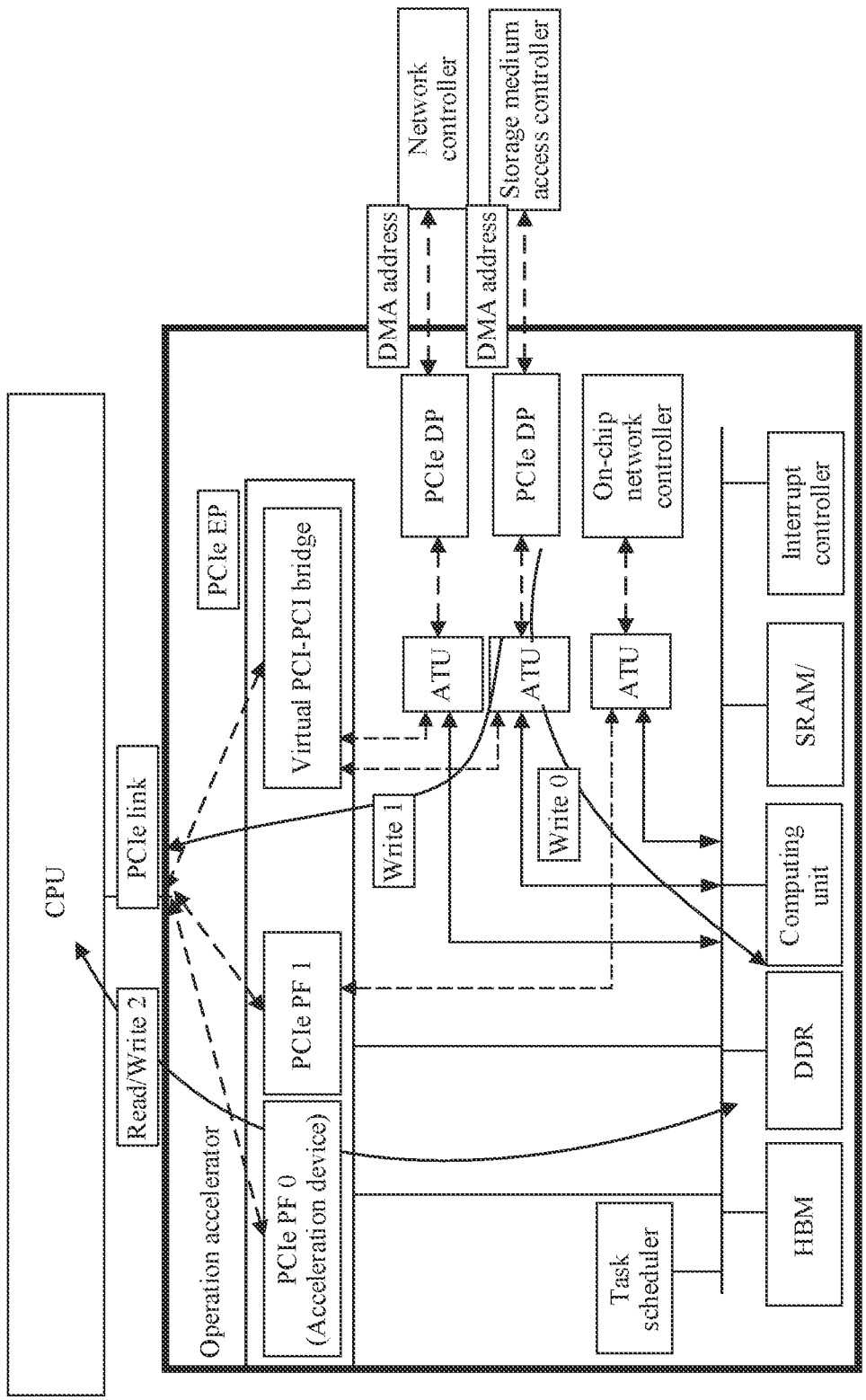
FIG. 8 is a schematic diagram of a structure of an operation accelerator according to another embodiment of this application.

FIG. 8 is a schematic diagram of a structure of an operation accelerator according to another embodiment of this application. As shown in FIG. 8, the operation accelerator is a multi-PCIe function device, and the operation accelerator is an independent functional unit (for example, a PCIe PF 0 in FIG. 8). A virtual PCI-PCI bridge is disposed on a PCIe EP. An on-chip network controller integrated in the operation accelerator is an independent PCIe device (for example, a PCIe PF 1 in FIG. 8).

The shunt circuit in FIG. 8 includes an ATU, a PCIe DP the virtual PCI-PCI, and the on-chip network controller. It can be learned by comparing FIG. 8 and FIG. 7 that, a difference between the operation accelerator in FIG. 8 and the operation accelerator in FIG. 7 lies only in that the shunt circuit is different, and other components are the same. According to comparison of FIG. 6, FIG. 7, and FIG. 8, the shunt system in FIG. 8 is a combination of the shunt circuit in FIG. 6 and the shunt circuit in FIG. 7. It may be understood that, in this embodiment of this application, the shunt system in the operation accelerator includes at least one PCIe downstream interface, the virtual PCI-PCI bridge, an address translator connected to the at least one PCIe downstream interface, at least one internal PCIe device, and an address translator corresponding to the at least one internal PCIe device. The internal PCIe device refers to a PCIe device integrated with the operation accelerator.

Optionally, the shunt system includes a first address translator, a first PCIe device, a second address translator, a first PCIe downstream interface, and the virtual PCI-PCI bridge. The first address translator is connected to the first PCIe device (the on-chip network controller) through a PCIe link. The first address translator is configured to receive first data sent by the first PCIe device, and after translating a first address into an internal physical address, transmit the first data through an internal bus. The first address translator is further configured to transmit second data sent by the first PCIe device to the processor through the PCIe link. The first PCIe downstream interface is configured to receive third data sent by a second PCIe device (a network controller or a storage medium access controller) through the PCIe link, and send the third data to the second address translator. A third address carried in the third data is located in a first range. A second PCIe device is an external device of the operation accelerator. The second address translator is configured to translate the third address, and transmit the third data through the internal bus. The first PCIe downstream interface is further configured to receive fourth data sent by the second PCIe device through the PCIe link, and send the fourth data to the second address translator. A fourth address carried in the fourth data is located in a second range. The second address translator is further configured to transmit the fourth data to the virtual PCI-PCI through the PCIe link. The virtual PCI-PCI is configured to transmit the fourth data to the processor through the PCIe link.

In this embodiment of this application, the address translator can ensure an order between an access operation from the PCIe device to local memory space of the operation accelerator and an access operation from the PCIe device to a CPU. The process in FIG. 8 is used as an example. A storage medium controller sends a "write 0" operation to a DDR, followed by a "write 1" operation sent to the CPU. There is an order between the "write 1" operation and the "write 0" operation. After detecting the "write 1" operation, the CPU starts a "read/write 2" transaction operation. The "read/write 2" transaction operation can detect a "write 0" operation result. The ATU, the PCIe DP, or the on-chip network controller can block a subsequent operation based on destination space, to ensure that the subsequent "write 1" operation is blocked before the "write 0" transaction operation takes effect, in other words, the "write 1" operation does not take effect. Optionally, the ATU places received write and read operations into a same queue that maintains the order for queue management, and after a previous operation reaches an order-preserving point in the system and is confirmed, sends a next operation. If a destination is a same component, the ATU continuously sends operations.

It can be learned from FIG. 8 that, a communication path between the operation accelerator and the CPU and a communication path between the operation accelerator and the network controller/storage medium controller only generate a common path in the DDR or an HBM, and are not in conflict with another path that works independently on an interface circuit. The operation accelerator, a switch, and the CPU in FIG. 8 may form a processing system.

In this embodiment of this application, the on-chip network controller, the network controller, and the storage medium access controller are all independent devices, and their drivers are all executed on the processor. Therefore, addresses used by these PCIe devices are all DMA addresses mapped from the processor, and the PCIe devices use the addresses to access data in internal space of the processor and the operation accelerator.

Figure 9:
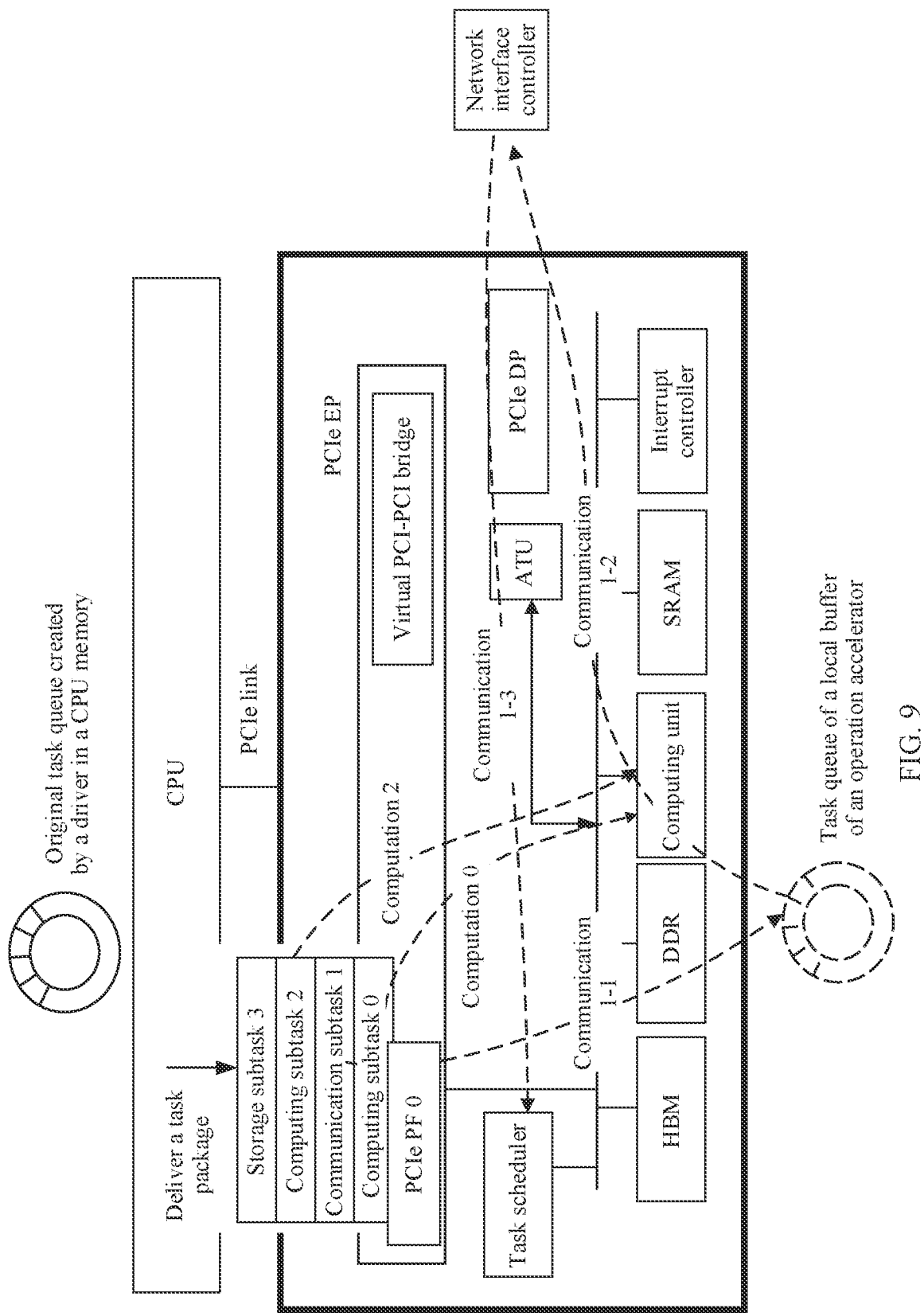
FIG. 9 is a schematic diagram of a structure of an operation accelerator according to another embodiment of this application.

FIG. 9 is a schematic diagram of a structure of an operation accelerator according to another embodiment of this application. The operation accelerator in FIG. 9 is the same as the operation accelerator in FIG. 7 or FIG. 8. In this embodiment of this application, the operation accelerator may directly communicate with a PCIe device through a shunt circuit, without participation of a CPU in scheduling. The operation accelerator includes a task scheduler. The task scheduler is configured to receive at least two subtasks sent by a processor, and store the at least two subtasks in a buffer. A first subtask in the at least two subtasks needs to be executed after a second subtask is completed. The task scheduler is further configured to: after the first subtask is completed, transmit a target instruction to the shunt circuit through an internal bus. The target instruction is used to instruct a third PCIe device to execute the second subtask. The shunt circuit is configured to send the target instruction to the third PCIe device through a PCIe link. The third PCIe device is directly connected to the shunt circuit through the PCIe link. After determining that the first subtask is completed, the task scheduler may directly send the target instruction to the third device through the shunt circuit, and does not need to bypass the CPU to complete communication as shown in FIG. 2. The shunt circuit is further configured to receive a completion instruction sent by the third PCIe device through the PCIe link, and send the completion instruction to the task scheduler through the internal bus. The completion instruction is used to indicate that the second subtask is completed. The task scheduler is further configured to: after receiving the completion instruction, schedule a computing unit or a fourth PCIe device to execute a third subtask. The third subtask needs to be executed after the second subtask is completed. The computing unit is a component that is in the operation accelerator and that is configured to execute the third subtask. The operation accelerator may receive, through the shunt circuit, the completion instruction sent by the third PCIe device through the PCIe link. This implements high communication efficiency.

In this embodiment of this application, the task scheduler may load a task package (the at least two subtasks) allocated by the CPU to the buffer (for example, the DDR in FIG. 9) in the operation accelerator. With reference to FIG. 9, the following describes a specific example of scheduling each subtask by the task scheduler. The example may include the following steps:

1. The task scheduler receives four subtasks allocated by the CPU.

2. The operation accelerator submits a computing subtask 0 to the computing unit for execution.

3. After receiving an event indicating that the computing subtask 0 is complete, the operation accelerator places a communication subtask 1 in a task queue of the buffer.

4. The operation accelerator notifies a network controller to execute the communication subtask 1.

5. The operation accelerator receives the completion event sent by the network controller.

6. The operation accelerator starts a blocked computing subtask 2 based on an event indicating that the network communication subtask 1 is complete, and submits the blocked computing subtask 2 to the computing unit.

7. The operation accelerator receives the completion event sent by the computing unit.

8. The operation accelerator places a storage subtask 3 in the task queue of the buffer.

9. The operation accelerator notifies a storage medium access controller to execute the storage subtask 3.

In this embodiment of this application, the operation accelerator directly communicates with the PCIe device through the shunt circuit, so that each PCIe device and the computing unit can be quickly notified to execute the task allocated by the CPU. This avoids a delay caused by CPU scheduling.

Figure 10:
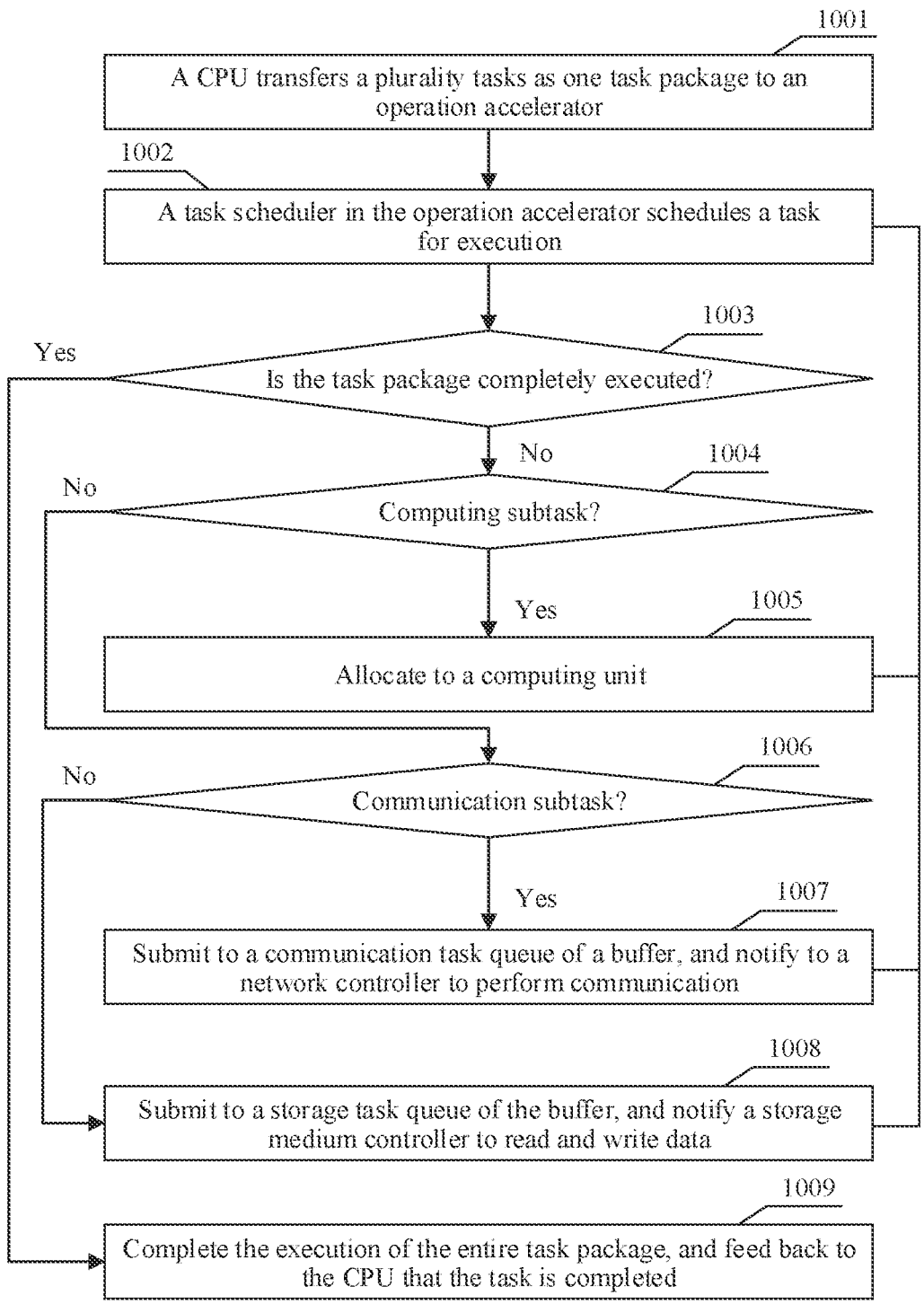
FIG. 10 is a flowchart of a subtask scheduling method according to an embodiment of this application.

FIG. 10 is a flowchart of a subtask scheduling method according to an embodiment of this application. As shown in FIG. 10, the method may include the following steps.

1001: A CPU transfers a plurality of tasks as one task package to an operation accelerator.

1002: A task scheduler (a processor) in the operation accelerator schedules a task for execution.

1003: The task scheduler determines whether execution of the task package is completed.

If yes, 1010 is performed. If no, 1004 is performed.

1004: The task scheduler determines whether a current subtask is a computing subtask.

If yes, 1005 is performed. If no, 1006 is performed.

1005: The task scheduler allocates the current subtask to a computing unit.

1006: The task scheduler determines whether the current subtask is a communication subtask.

If yes, 1007 is performed. If no, 1008 is performed.

1007: The task scheduler submits the communication subtask to a communication task queue of a buffer, and notifies a network controller to perform communication.

1009: Submit to a storage task queue of the buffer, and notify a storage medium controller to read and write data.

1010: Feed back to the CPU that the task is completed after the execution of the entire task package is completed.

In the method shown in FIG. 10, the operation accelerator does not execute an input/output IO protocol stack. The operation accelerator submits the subtask for the execution only based on dependency between the subtasks, and directly initiates a next subtask internally after the communication or a storage access command is completed. Therefore, a host CPU is no longer bypassed. In this way, a coordinated processing process of the CPU is reduced, and a delay is reduced.

Figure 11:
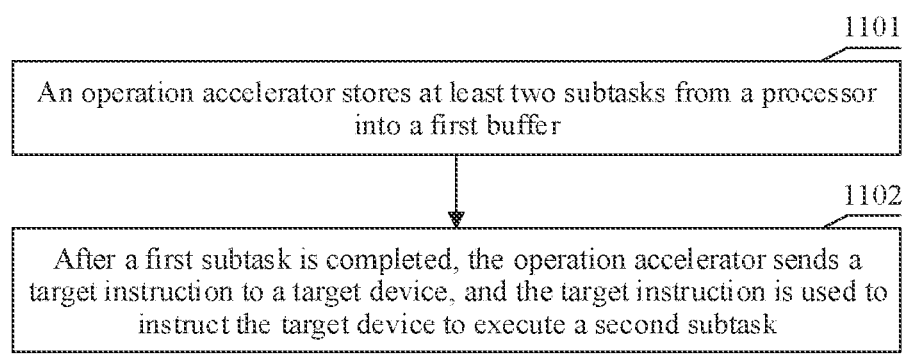
FIG. 11 is a flowchart of a task scheduling method according to an embodiment of this application.

FIG. 11 is a flowchart of a task scheduling method according to an embodiment of this application. The method includes:

1101: An operation accelerator stores at least two subtasks from a processor into a first buffer.

A second subtask in the at least two subtasks needs to be executed after a first subtask is completed. Optionally, the processor allocates the at least two subtasks that can be processed by the operation accelerator to the operation accelerator. The at least two subtasks may include at least one computing subtask.

In an optional implementation, after the operation accelerator stores the at least two subtasks from the processor into the first buffer, the method further includes:

The operation accelerator submits the second subtask to a target task queue in a second buffer. The target task queue is a task queue to be executed by a third PCIe device.

Optionally, after the first subtask is completed, the operation accelerator submits the second subtask to the target task queue in the second buffer. The second buffer may be the same as or different from the first buffer.

In this implementation, the operation accelerator may submit the second subtask to a corresponding task queue in time, to ensure that the task can be quickly processed.

1102: After the first subtask is completed, the operation accelerator sends a target instruction to a target device. The target instruction is used to instruct the target device to execute the second subtask.

In this embodiment of this application, the operation accelerator may directly schedule the target device to execute a corresponding task, without participation of the processor. This improves scheduling efficiency.

Figure 12:
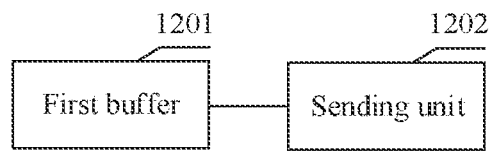
FIG. 12 is a schematic diagram of a structure of an operation accelerator according to another embodiment of this application.

FIG. 12 shows an operation accelerator according to an embodiment of this application. The operation accelerator includes:

a first buffer 1201, configured to store at least two subtasks from a processor, where a second subtask in the at least two subtasks needs to be executed after a first subtask is completed; and a sending unit 1202, configured to send a target instruction to a target device after the first subtask is completed, where the target instruction is used to instruct the target device to execute the second subtask.

In this embodiment of this application, the operation accelerator may directly schedule the target device to execute a corresponding task, without participation of the processor. This improves scheduling efficiency.

In an optional implementation, the sending unit 1202 is further configured to submit the second subtask to a target task queue in a second buffer. The target task queue is a task queue to be executed by a third PCIe device.

In this implementation, the operation accelerator may submit the second subtask to a corresponding task queue in time, to ensure that the task can be quickly processed.

Figure 13:
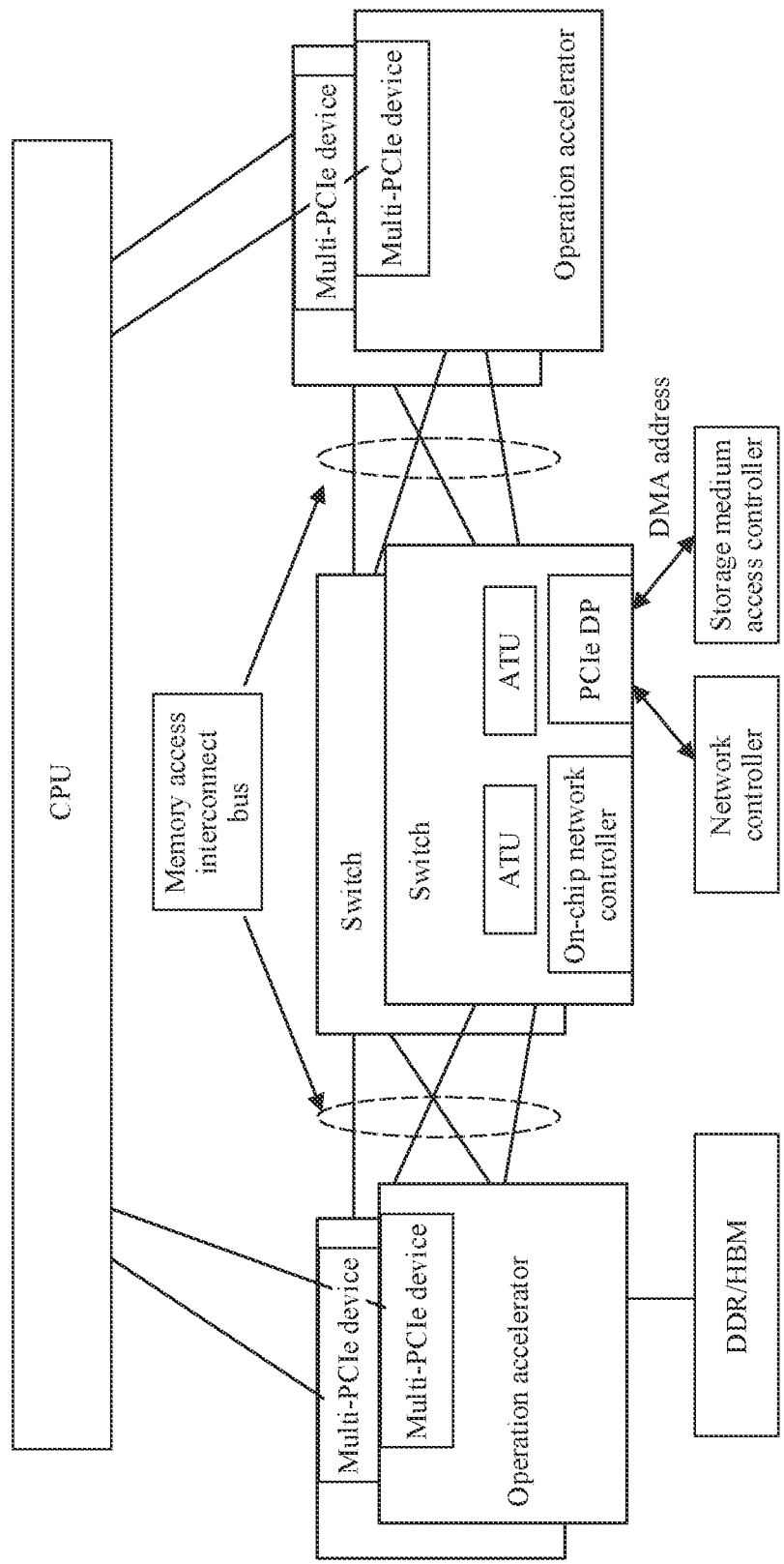
FIG. 13 is a schematic diagram of a structure of a switch according to an embodiment of this application.

In the foregoing embodiments, a shunt circuit is integrated into the operation accelerator. The following describes a solution in which the shunt circuit is integrated into a switch. FIG. 13 is a schematic diagram of a structure of a switch according to an embodiment of this application. As shown in FIG. 13, a shunt circuit similar to that in FIG. 8 is integrated in the switch. In an actual application, the switch may use any shunt circuit shown in FIG. 6 to FIG. 8. As shown in FIG. 13, an operation accelerator and the switch are connected through a memory access interconnect bus (a memory bus). The shunt circuit may transmit data or an instruction sent by a PCIe device to a CPU through a PCIe link, or may transmit data or an instruction sent by a PCIe device to a CPU through the memory access interconnect bus (the memory bus). A working principle of the shunt circuit in FIG. 13 is the same as the working principle of the shunt circuit in FIG. 8. Details are not described herein again.

When the CPU programs an on-chip network controller integrated in the switch or another PCIe device connected to a PCIe DP on the switch, a standard PCIe driver framework is still used. An address configured for the on-chip network controller or the PCIe EP to connect to the PCIe device is a DMA address mapped from the CPU. When a computing unit or the on-chip network controller in the operation accelerator uses the address to access memory space, a local ATU (address translation unit) is first matched. If it is determined that the accessed memory space is a buffer of the operation accelerator, a local physical address is directly used to access the operation accelerator. If it is determined that the accessed memory space is the CPU, information of {a PCIe requester identifier, a PASID, a complete 64-bit DMA address} that is originally input and that should be included in PCIe transmission is packaged and transmitted on an internal physical address domain interconnect, and an original driver framework remains unchanged.

In this embodiment of this application, a network controller and a storage medium access controller are centralized on the switch, and interconnection networks between operation accelerators are unified. This facilitates a physical spatial layout, device sharing between the operation accelerators, and simultaneous use of a plurality of network controllers or storage media by one operation accelerator.

An embodiment of this application provides a computer-readable storage medium. The computer-readable storage medium stores a computer program, and the computer program includes a software program instruction. When the program instruction is executed by a processor, at least two subtasks from the processor are stored in a first buffer. A second subtask in the at least two subtasks needs to be executed after a first subtask is completed. After the first subtask is completed, a target instruction is sent to a target device. The target instruction is used to instruct the target device to execute the second subtask.

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. An operation accelerator, comprising:
a shunt circuit connected to a first peripheral component interconnect express (PCIe) device through a PCIe link, wherein the shunt circuit is configured to:
receive first data sent by the first PCIe device through the PCIe link;
transmit the first data through an internal bus, wherein a first address carried in the first data is located in a first range; and
send, to at least one processor through the PCIe link, second data sent by the first PCIe device through the PCIe link, wherein a second address carried in the second data is located in a second range, and the first range and the second range do not overlap, wherein the shunt circuit comprises a first address translator and the first PCIe device, and the first address translator is connected to the first PCIe device through the PCIe link, wherein the first address translator is configured to:
receive the first data sent by the first PCIe device; and
transmit the first data through the internal bus after translating the first address into an internal physical address.

2. The operation accelerator according to claim 1, wherein the shunt circuit is further configured to:
receive data or an instruction transmitted by the internal bus; and
send the data or the instruction to the first PCIe device through the PCIe link.

3. The operation accelerator according to claim 2, wherein the first address translator is further configured to:
transmit, to the at least one processor through the PCIe link, the second data sent by the first PCIe device.

4. The operation accelerator according to claim 3, wherein the shunt circuit further comprises a second address translator and a first PCIe downstream interface, wherein:
the first PCIe downstream interface is configured to receive third data sent by a second PCIe device through the PCIe link, and send the third data to the second address translator, wherein a third address carried in the third data is located in the first range, and the second PCIe device is an external device of the operation accelerator; and
the second address translator is configured to translate the third address, and transmit the third data through the internal bus.

5. The operation accelerator according to claim 4, wherein the shunt circuit further comprises a virtual PCI-PCI bridge, wherein:
the first PCIe downstream interface is further configured to receive fourth data sent by the second PCIe device through the PCIe link, and send the fourth data to the second address translator, wherein a fourth address carried in the fourth data is located in the second range;
the second address translator is further configured to transmit the fourth data to the virtual PCI-PCI bridge through the PCIe link; and
the virtual PCI-PCI bridge is configured to transmit the fourth data to the at least one processor through the PCIe link.

6. The operation accelerator according to claim 1, wherein the shunt circuit comprises a third address translator and a second PCIe downstream interface, wherein:
the second PCIe downstream interface is configured to receive the first data sent by the first PCIe device through the PCIe link, and send the first data to the third address translator; and
the third address translator is configured to transmit the first data through the internal bus after translating the first address into an internal physical address.

7. The operation accelerator according to claim 6, wherein the shunt circuit further comprises a virtual PCI-PCI bridge, wherein:
the second PCIe downstream interface is further configured to send the second data to the third address translator;
the third address translator is further configured to transmit the second data to the virtual PCI-PCI bridge through the PCIe link; and
the virtual PCI-PCI bridge is configured to transmit the second data to the at least one processor through the PCIe link.

8. The operation accelerator according to claim 1, wherein the operation accelerator further comprises a task scheduler, wherein:
the task scheduler is configured to:

receive at least two subtasks sent by at least one processor, and store the at least two subtasks in a buffer, wherein a second subtask in the at least two subtasks needs to be executed after a first subtask is completed;

transmit a target instruction to the shunt circuit through the internal bus after the first subtask is completed, wherein the target instruction is used to instruct a third PCIe device to execute the second subtask; and the shunt circuit is configured to send the target instruction to the third PCIe device through the PCIe link, wherein the third PCIe device is connected to the shunt circuit through the PCIe link.

9. The operation accelerator according to claim 8, wherein the task scheduler is further configured to submit the second subtask to a target task queue in a second buffer, wherein the target task queue is a task queue to be executed by the third PCIe device.

10. The operation accelerator according to claim 9, wherein:

the shunt circuit is further configured to receive a completion instruction sent by the third PCIe device through the PCIe link, and send the completion instruction to the task scheduler through the internal bus, wherein the completion instruction is used to instruct that the second subtask is completed; and the task scheduler is further configured to schedule a computing unit or a fourth PCIe device to execute a third subtask after receiving the completion instruction, wherein the third subtask needs to be executed after the second subtask is completed, and the computing unit is a component that is in the operation accelerator and that is configured to execute the third subtask.

11. A switch, comprising:

a shunt circuit connected to a first peripheral component interconnect express (PCIe) device through a PCIe link, wherein the shunt circuit is directly connected to an operation accelerator through a memory bus, and wherein the shunt circuit is configured to:

receive first data sent by the first PCIe device through the PCIe link;

send the first data to the operation accelerator through the memory bus, wherein a first address carried in the first data is located in a first range;

receive second data sent by the first PCIe device through the PCIe link; and send the second data to at least one processor through the PCIe link, wherein a second address carried in the second data is located in a second range, and the first range and the second range do not overlap, wherein the shunt circuit comprises a first address translator and the first PCIe device, and the first address translator is connected to the first PCIe device through the PCIe link, wherein the first address translator is configured to:

receive, through the PCIe link, the first data sent by the first PCIe device; and send the first data to the operation accelerator through the memory bus after translating the first address into a local physical address, wherein the local physical address is used to access the operation accelerator.

12. The switch according to claim 11, wherein the shunt circuit is further configured to:

receive data or an instruction from the operation accelerator through an internal bus; and send the data or the instruction to the first PCIe device through the PCIe link.

13. The switch according to claim 12, wherein the first address translator is further configured to: transmit, to the at least one processor through the PCIe link, the second data sent by the first PCIe device.

14. The switch according to claim 13, wherein the shunt circuit further comprises a second address translator and a first PCIe downstream interface, wherein:

the first PCIe downstream interface is configured to receive third data sent by a second PCIe device through the PCIe link, and send the third data to the second address translator, wherein a third address carried in the third data is located in the first range, and the second PCIe device is an external device of the switch; and the second address translator is configured to translate the third address, and send the third data to the operation accelerator through the memory bus.

15. The switch according to claim 14, wherein the shunt circuit further comprises a virtual PCI-PCI bridge, wherein:

the first PCIe downstream interface is further configured to receive fourth data sent by the second PCIe device through the PCIe link, and send the fourth data to the second address translator, wherein a fourth address carried in the fourth data is located in the second range;

the second address translator is further configured to transmit the fourth data to the virtual PCI-PCI bridge through the PCIe link; and the virtual PCI-PCI bridge is configured to transmit the fourth data to the at least one processor through the PCIe link.

16. The switch according to claim 11, wherein the shunt circuit comprises a third address translator and a second PCIe downstream interface, wherein:

the second PCIe downstream interface is configured to receive the first data sent by the first PCIe device through the PCIe link, and send the first data to the third address translator; and the third address translator is configured to send the first data to the operation accelerator through the memory bus after translating the first address into a local physical address, wherein the local physical address is used to access the operation accelerator.

* * * * *